A. M. DEMUTH.
COOKING APPARATUS.
APPLICATION FILED NOV. 13, 1920.

1,393,763.

Patented Oct. 18, 1921.
2 SHEETS—SHEET 1.

Inventor
Alfred M. Demuth
By: J. F. Joehnum Jr. Atty.

A. M. DEMUTH.
COOKING APPARATUS.
APPLICATION FILED NOV. 13, 1920.
1,393,763.
Patented Oct. 18, 1921.
2 SHEETS—SHEET 2.
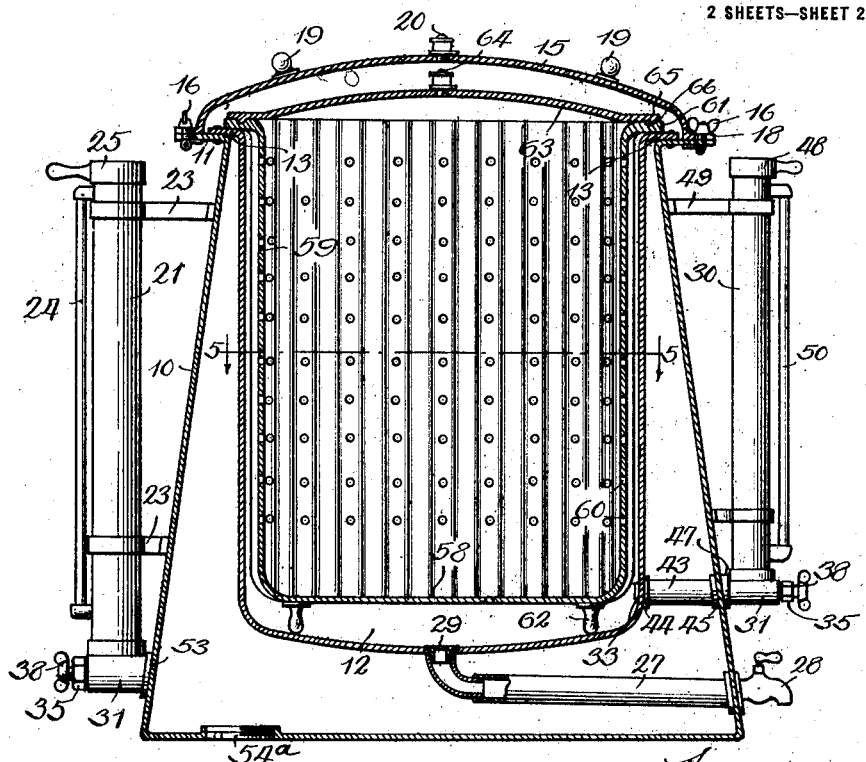
Fig. 4
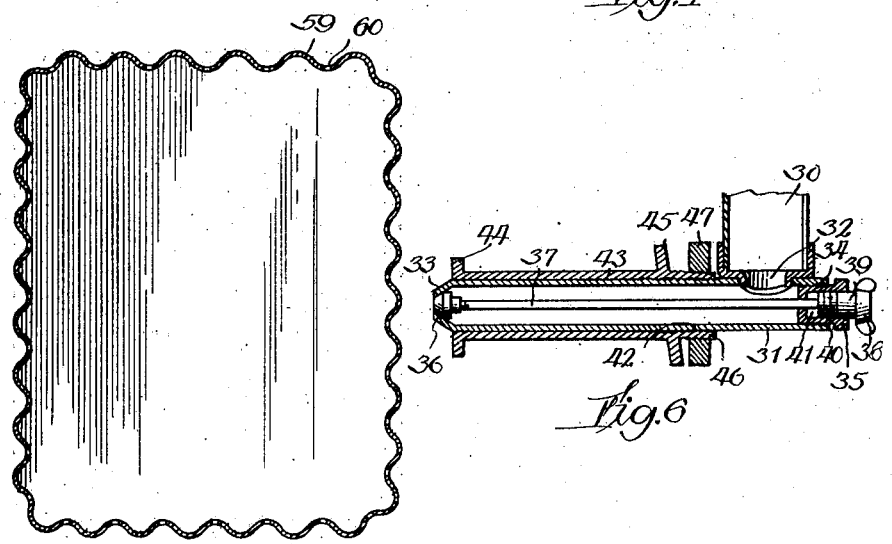
Fig. 5
Fig. 6
Inventor,
Alfred M. Demuth,
By:

UNITED STATES PATENT OFFICE.

ALFRED M. DEMUTH, OF CHICAGO, ILLINOIS, ASSIGNOR TO DEMUTH MANUFACTURING COMPANY, OF CHICAGO, ILLINOIS, A CORPORATION OF ILLINOIS.

COOKING APPARATUS.

1,393,763.  Specification of Letters Patent.  Patented Oct. 18, 1921.

Application filed November 13, 1920. Serial No. 423,914.

*To all whom it may concern:*

Be it known that I, ALFRED M. DEMUTH, a citizen of the United States, residing at Chicago, in the county of Cook and State of Illinois, have invented certain new and useful Improvements in Cooking Apparatus, of which the following is a specification.

This invention relates to improvements in apparatus particularly adapted though not necessarily limited in its use for cooking articles of food by means of the heat of boiling, or hot water or steam maintained under a predetermined degree of pressure, the vapor from the heating medium being maintained out of contact and commingling relation with the articles being cooked or treated, and one of the objects of the invention is to provide an improved apparatus of this character by means of which the articles of food may be cooked or treated either entirely in their own juices, or if desired, in liquid and which liquid may be supplied to the food or article containing chamber either automatically or at will as necessary or desired.

A further object is to provide improved means whereby the liquid which is converted into vapor exterior of the cooking chamber may be automatically replenished when necessary or desired.

A further object is to provide an improved portable, self-contained apparatus of this character which will be comparatively light, simple and durable in construction and effective and efficient in operation.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention and in which Figure 1 is a side elevation.

Fig. 4 is a view similar to Fig. 2 partly in elevation, partly in section, and partly broken away showing a modified arrangement.

Fig. 5 is a detail horizontal sectional view taken on line 5—5, Fig. 4.

Fig. 6 is an enlarged detail sectional view of the valve structure.

Figure 1:
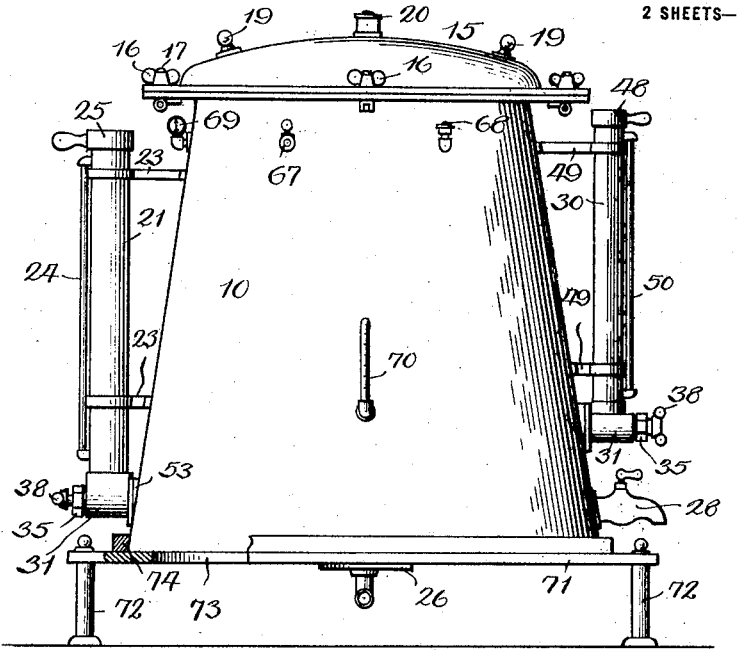
Figure 2:
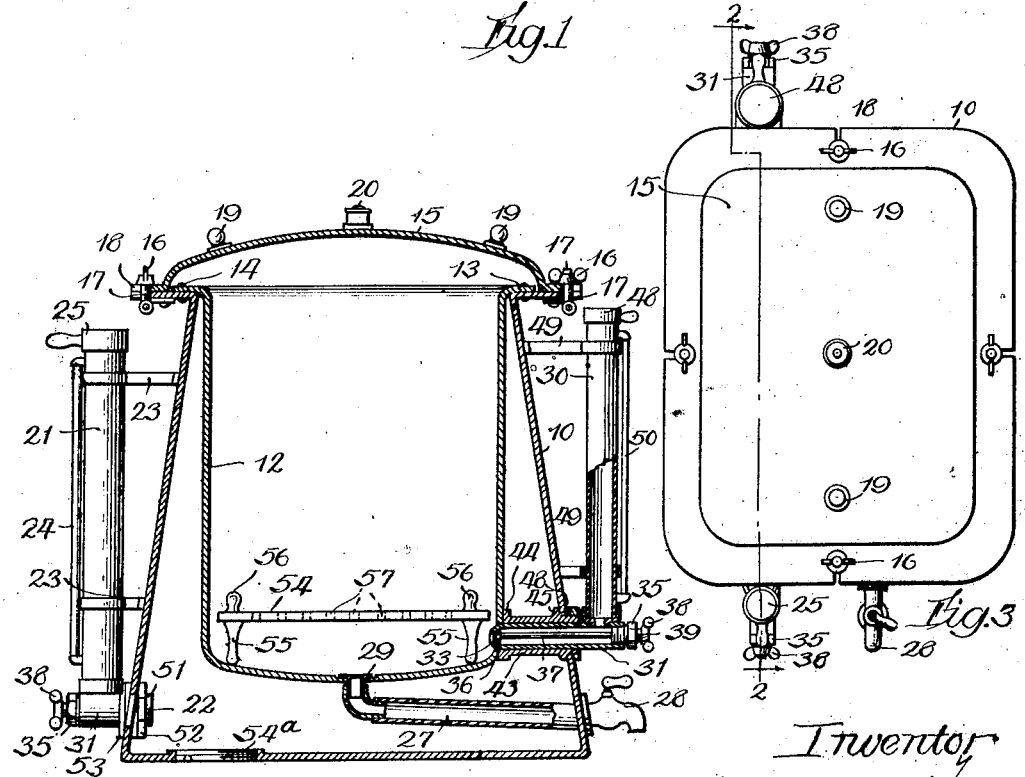
Fig. 2 is a vertical sectional view taken on line 2—2, Fig. 3.
Figure 3:
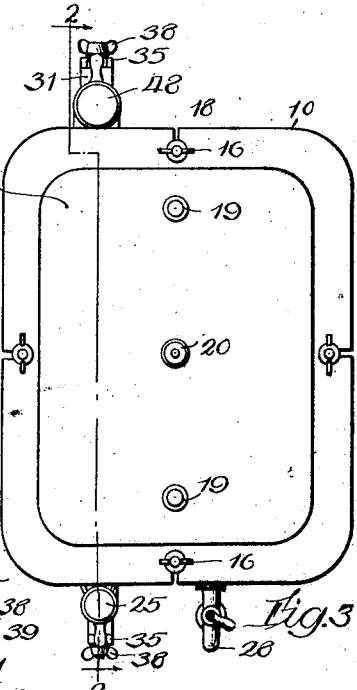
Fig. 3 is a top plan view.

Referring more particularly to the drawings the numeral 10 designates a suitable tank of any desired size and configuration which is open at the top and is preferably provided with a circumferential laterally projecting flange 11, at the top thereof.

Arranged within the tank 10, is a cooking or treating chamber 12, which may be of any desired size and configuration but is of such a size and shape that it will extend into the tank 10, so that the walls of the cooking or treating chamber will be maintained spaced from the walls of the tank to form a space around the chamber for a heating medium. This chamber 12, is preferably provided with a circumferential flange 13, around its open upper end and which flange is adapted to engage and rest upon the flange 11, for supporting the chamber and the chamber is held in position in any suitable manner such as by means of bolts or rivets 14, or if desired the same may be welded so as to form a closure between the chamber 12, and the tank 10, to prevent the vapor from the tank 10, from coming into commingling relation with any of the contents of the chamber 12.

A suitable cover or closure 15, is provided which serves as a closure for the chamber 12, and the cover is held in position in any suitable manner such as by means of fastening nuts 16, connected with pivoted bolts 17, the latter being adapted to enter suitable open slots 18, in the edge of the cover 15, so that the chamber 12, may be hermetically sealed.

Suitable handles 19, may be provided for the cover and a safety air blow off 20, is also provided in the cover. This valve 20, is set for a predetermined pressure so that when the pressure within the chamber 12, rises above a predetermined degree the valve 20, will automatically open to permit the escape of the vapor from the chamber.

The vapor in the tank 10, is preferably generated by means of liquid supplied thereto and to that end there is provided a liquid supply holder 21, which has a connection with the tank 10, to discharge thereinto adjacent the bottom of the tank as at 22. The holder 21, is supported by the connection with the tank and if desired suitable supporting brackets 23, may also be provided. A liquid gage 24, is provided for the holder 21, to indicate the level of the liquid therein and the holder 21, is provided with a closure 25, which is preferably removable to permit filling of the holder 21, and when the closure is in position the holder 21, will be sealed at its top to prevent the entrance of air. With this construction it will be manifest that liquid from the holder 21, will flow into the tank 10, until the liquid level in the tank reaches a point just above the inlet opening 22, at which time no more liquid will be supplied to the tank 10, until the liquid therein has been consumed. By this provision it will be manifest that as the liquid level in the tank 10, lowers the supply will be replenished from the holder 21, until the supply is cut off by reason of the liquid in the tank 10, sealing the outlet opening 22.

This opening 22, may be controlled in any suitable manner such as by means of a valve to be hereinafter more fully descibed.

The operation of the apparatus thus far described is thought to be fully understood from the foregoing description but briefly stated it is as follows.

The opening 22, is closed by the valve and the liquid holder 21, is then filled with liquid after which the closure 25, is placed in position to seal the holder 21. The outlet 22, is then opened so as to permit some of the liquid within the holder 21, to enter the tank 10, and the flow of liquid into the tank will continue until it is checked by reason of the liquid level in the tank 10, reaching a point slightly above the outlet 22.

Heat is then applied to the bottom of the tank 10, in any suitable manner such as by means of burner 26.

The articles of food are then placed within the chamber 12, and the cover 15, secured in position.

The articles of food will then be cooked or treated entirely in their own juices and when desired may be removed from the chamber by removing the closure 15.

The chamber 12, is provided with a draw off conduit 27, which leads from the bottom of the chamber 12, through the wall of the tank 10, and is provided with a cock or faucet 28, for controlling the same. A strainer 29, may be provided over the inlet of the conduit 27, and when articles of food are being cooked that have not much juice, the inlet of the conduit 27 may be closed by means of any suitable plug or closure, and which latter may be removed when it is desired to withdraw the juices from the chamber 12.

In cooking or treating certain articles of food it is sometimes desired and sometimes necessary, according to the treating operation that it is desired to perform in the chamber 12, to supply liquid to the chamber. To that end the liquid may be supplied thereto in a manner similar to the manner in which it is supplied to the tank 10, that is by means of a liquid supply holder 30, which is arranged exterior of the tank 10, and is provided with a tubular portion or casing 31, at the bottom thereof and which has communication with the chamber 30, through a suitable opening 32. This casing 31, may be of any desired diameter and length, both ends thereof being open, one extremity being preferably contracted or reduced in size as at 33, to form a valve seat. Within the other end of the casing 31, there is removably seated, preferably by means of screw threads a bushing 34, having an angular shaped head 35, by means of which the bushing may be readily removed or placed in position. Within the casing 31, is arranged a valve 36, which coöperates with the valve seat formed by the reduced extremity 33. A valve stem 37, is connected with the valve 36, and the stem extends through the bushing 34, terminating in a head or handle 38. A portion of the stem 37, adjacent the handle 38, is enlarged as at 39, and a portion of this enlargement is threaded as at 40. The enlarged portions 39, and the threaded portion 40, operate within the recess 41, in the bushing 34, and the threads 40, on the stem engage threads on the wall of the recess 41, so that when the handle 38 is rotated the valve 36, will be moved toward or away from its seat according to the direction of rotation of the handle 38, and the screw threads 40, coöperating with the enlarged smooth portion 39, of the stem serve as a means for producing a fluid tight joint.

The casing 31, is provided intermediate its ends with exterior screw threads 42, for a purpose to be hereinafter set forth.

The liquid holder 30, and the casing 31, just described, are adapted to be held in position so that the casing 31, will extend through the wall of the tank 10, and also through the wall of the chamber 12, in any suitable manner but there is preferably provided a spacing member or element 43. This member 43, is arranged between the wall of the chamber 12, and the tank 10, and is itself supported in any suitable manner preferably by extending through an opening in the wall of the tank 10. The member 43, is provided with spaced flanges 44—45, one of which contacts with the outer face of the wall of the chamber and the other with the inner face of the wall of the tank while the extremity 46, of the member 43, projects through and beyond the wall of the tank 10. This extremity is provided with exterior screw threads adapted to receive a nut or collar 47, and which nut or collar coöperates with the adjacent flange on the member 43, so as to clamp the wall of the tank 10. If desired or necessary a suitable washer or packing 48, may be provided to form a fluid tight joint.

Suitable brackets or collars 49, may also be provided for assisting in holding the liquid holder 30, in position.

With this form of valve it will be noted that the supply from the holder 30, may be cut off entirely but when it is desired, the valve 36, may be unseated to any suitable extent to permit the liquid in the holder 30, to flow into the chamber 12. The holder 30, is provided with a closure 48, so that when the level of the liquid in the chamber 12, reaches a point slightly above the opening in the end of the element 31, the supply of liquid will be automatically cut off.

It will therefore be seen that with this improved apparatus any form of cooking or treatment of the article within the chamber 12, may be performed. If it is desired to cook the articles in their own juices the supply of liquid from the holder 30, is cut off but when it is desired to supply liquid to the chamber 12, so that the liquid will be converted into vapor and thereby assist in another form of treatment of the article within the chamber, the valve 36, may be opened and may be allowed to remain open so that as the liquid in the chamber 12, is consumed, it will be automatically replaced from the holder 30, or a predetermined supply of liquid may be had within the chamber 12, and then the supply cut off.

A suitable liquid gage 50, may be provided for indicating the level of the liquid in the holder 30.

The valve which controls the outlet 22, of the supply holder 21, is of a similar construction but is mounted in a slightly different manner. With this form of valve the casing 31, is provided adjacent one end with exterior screw threads 51, adapted to receive a nut 52, and which nut coöperates with a flange 53, on the casing for clamping the wall of the tank.

A clean-out opening closed by a suitable plug or closure 54ª, may be provided for the tank 10.

When liquid is supplied to the chamber 12, it is desirable that the article being treated within the chamber be supported in such a manner that the liquid will not come directly in contact therewith and to that end, there may be provided a suitable supporting rack or platform 54, having legs 55, and handles 56, the rack or support being provided with suitable perforations 57, or may be formed of any suitable reticulated or foraminous material.

In the form of the invention shown in Figs. 4 and 5, the articles to be treated are placed within a suitable basket or container 58, the walls of which are preferably corrugated as at 59, there being suitable openings 60, arranged in certain portions of the corrugations so as to permit the steam or vapor to enter the holder 58. The basket or holder is of a size and configuration to fit snugly within the chamber 12, and is provided with a flange 61, adapted to engage and rest upon the flange 13, for supporting the basket, but if desired there may be provided suitable feet or supports 62, adapted to rest upon the chamber 12.

It will therefore be seen that when this basket is placed in position there will be formed flues or passages up the sides thereof between the basket and the wall of the chamber 12, and through which passages steam from the liquid in the chamber 12, will flow and enter the basket and come into commingling relation with the articles held therein.

This basket 58, is provided with a suitable closure 63, having a safety air valve 64, therein to permit the escape of vapor from the basket when the pressure exceeds a predetermined degree.

The cover 63, is provided with a circumferential depending rib 65, preferably adjacent the periphery of the cover and this rib is seated in an annular groove or recess 66, in the flange 61, so as to form a fluid tight joint.

With this form of the invention it will be seen that when the pressure exceeds a predetermined degree within the basket 58, a portion thereof will escape through the valve 64, and this excess vapor will escape through the valve 20, which latter may be set for operation at a degree or temperature less than the degree or temperature at which the valve 64, is set to operate.

The perforations 60, in the wall of the basket 58, preferably terminate a considerable distance short of the bottom 58 of the basket so that the juices from the articles being cooked or treated will be collected within the basket and will not escape through the perforations 60.

The tank 10, is provided with a blow off cock 67, and safety valve 68, a steam or vapor gage 69, and liquid gage 70.

In operation, it is sometimes desired, when cooking articles of food, to brown them to a greater extent than they would be browned in the event that the heating medium is considerably moist. In other words when it is desired to brown the articles of food it is better accomplished by employing a drier heating medium. In order that this may be accomplished, the cock 67, of the tank 10, is opened so as to permit any desired portion of the vapor in the tank and around the chamber 12, to escape thereby producing a drier heating medium, and it has been found by actual demonstration that the removing of a portion of this moist vapor will have the effect of causing the articles in the chamber to be browned by the drier heating medium coming into contact with the wall of the chamber 12.

The apparatus thus described is of a unitary structure, and is portable and comparatively light in construction adapted for several different forms of cooking or treating operations. In use the apparatus may be mounted upon a suitable support 71, having legs 72, and provided with an opening 73, with a flange 74, encompassing the opening and within which flange the tank is adapted to be seated so as to be placed above the opening 73.

While the preferred form of the invention has been herein shown and described it is to be understood that various changes may be made in the details of construction and in the combination and arrangement of the several parts, within the scope of the claims, without departing from the spirit of this invention.

What is claimed as new is:

1. An apparatus of the character described embodying a cooking or treating chamber, a tank in which liquid is converted into vapor, said tank and chamber being out of communication with each other and having a common wall therebetween, a liquid supply holder having a discharge outlet opening into the said chamber, means for controlling the said opening, and a closure for the chamber.

2. An apparatus of the character described embodying as a unitary structure a cooking or treating chamber, a tank in which liquid is converted into vapor, said tank and chamber being out of communication with each other and having a common wall therebetween, a liquid supply holder exterior of the tank having a discharge outlet opening extending through the tank and opening into the said chamber, means for controlling the said opening, and a closure for the chamber.

3. An apparatus of the character described embodying a cooking or treating chamber, a tank for containing a vaporous heating medium, said tank and chamber being out of communication with each other and having a common wall therebetween, a liquid supply holder, exterior of the tank and out of communication therewith, there being a communicating passage between the chamber and said liquid supply holder and discharging into the chamber adjacent the bottom thereof, means for controlling the said passage, and a closure for the chamber.

4. An apparatus of the character described embodying a cooking or treating chamber, a tank for containing a vaporous heating medium, said tank and chamber being out of communication with each other and having a common wall therebetween, a liquid supply holder, exterior of the tank and out of communication therewith, there being a communicating passage between the chamber and said liquid supply holder and discharging into the chamber adjacent the bottom thereof, means for controlling the said passage, a draw off leading from the chamber and through the wall of the tank, and a closure for the chamber.

5. An apparatus of the character described embodying a cooking or treating chamber, a tank for containing a vaporous heating medium, said tank and chamber being out of communication with each other and having a common wall therebetween, a liquid supply holder, exterior of the tank and out of communication therewith, there being a communicating passage between the chamber and said liquid supply holder and discharging into the chamber adjacent the bottom thereof, means for controlling the said passage, means forming a closure for the said liquid supply holder whereby the height of the liquid in the said chamber will be maintained substantially constant when the said passage is open, and a closure for said chamber.

6. As a unitary structure, a cooking or treating chamber, a tank in which liquid is converted into vapor, said tank and chamber being out of communication with each other and having a common wall therebetween, means operating automatically to maintain the liquid in the tank at a substantially constant level, means for controlling at will the last said means, means for supplying liquid to the chamber through the wall of the tank, means for controlling the last recited means, and a closure for the chamber.

7. As a unitary structure, a cooking or treating chamber, a tank in which liquid is converted into vapor, said tank and chamber being out of communication with each other and having a common wall therebetween, means operating automatically to maintain the liquid in the tank at a substantially constant level, means for controlling at will the last said means, means for supplying liquid to the chamber through the wall of the tank, means for controlling the last recited means, a draw off for the chamber and leading through the wall of the tank, means for controlling the draw off, and a closure for the chamber.

8. An apparatus of the character described embodying a chamber, a tank, said chamber and tank being out of communication with each other and having a common wall therebetween, a closure for the chamber, a liquid supply holder exterior to the tank and chamber and having communication with one of them, said communication embodying a passage way, and means for controlling the said passageway, the said means embodying a valve adjustably and removably seated in the said passageway.

9. An apparatus of the character described embodying a chamber, a tank, said chamber and tank being out of communication with each other and having a common wall therebetween, a closure for the chamber, a liquid supply holder exterior to the tank and chamber and having communication with one of them, said communication embodying a tubular element connected with the supply holder and detachably secured in position for supporting the said supply holder, valve mechanism contained within the said tubular element, and means adjustably and removably holding the valve in the said tubular element.

10. An apparatus of the character described embodying a chamber, a tank, said chamber extending into and being out of communication with the tank, a bearing element interposed between the walls of the chamber and tank, a liquid supply holder exterior of the tank and out of communication therewith, a tubular element connected and having communication with the said supply holder, said tubular element being removably seated in the said bearing, there being an opening in the wall of the chamber with which the tubular element has communication, a valve adjustably and removably seated in said tubular element and controlling the end thereof adjacent the chamber, and means for actuating the valve.

11. In combination, a chamber, a liquid supply holder exterior thereof, a valve casing connected therewith and projecting laterally therefrom, a portion of the casing intermediate its ends being exteriorly threaded, a supporting bearing into which the casing projects, said bearing having interior threads adapted to be engaged by the threads of the casing, a valve within the casing, and a handle connected with the valve for actuating the valve to open and close communication between the chamber and liquid supply holder.

12. In combination a chamber, a liquid supply holder exterior thereof, a valve casing connected therewith and projecting laterally therefrom, a portion of the casing intermediate its ends being exteriorly threaded, a supporting bearing into which the casing projects, said bearing having interior threads adapted to be engaged by the threads of the casing, a valve within the casing, a handle connected with the valve for actuating the valve to open and close communication between the chamber and liquid supply holder, and means whereby said valve and operating means therefor may be readily detached and removed from the casing.

13. An apparatus of the character described embodying a cooking chamber, a tank for receiving a heating medium, said chamber and tank being out of communication and having a common wall therebetween, means exterior of the tank and chamber for supplying liquid to the chamber, a foraminous container fitting within the chamber for receiving the material to be treated, a closure for the container, and means for closing the chamber.

14. An apparatus of the character described embodying a cooking chamber, a tank for receiving a heating medium, said chamber and tank being out of communication and having a common wall therebetween, means exterior of the tank and chamber for supplying liquid to the chamber, a foraminous container fitting within the chamber for receiving the material to be treated, a closure for the container, a safety blow off device in the said closure, and means for closing the chamber.

15. An apparatus of the character described embodying a cooking chamber, a tank for receiving a heating medium, said chamber and tank being out of communication and having a common wall therebetween, means exterior of the tank and chamber for supplying liquid to the chamber, a foraminous container fitting within the chamber for receiving the material to be treated, a closure for the container, and means for closing the chamber, the lower portion of the container for a considerable distance above the bottom thereof being imperforate.

16. An apparatus of the character described, embodying a cooking chamber, a tank for receiving a heating medium, said chamber and tank being out of communication and having a common wall therebetween, means exterior to the tank and chamber for supplying liquid to the chamber, a container removably fitting within and substantially filling the chamber, the walls of said container being vertically corrugated, there being perforations in certain of said corrugations, said perforations terminating short of the bottom of the container, a closure for the container, a closure for the chamber, and means securing the last recited closure in position.

17. An apparatus of the character described, embodying a cooking chamber, a tank for receiving a heating medium, said chamber and tank being out of communication and having a common wall therebetween, means exterior to the tank and chamber for supplying liquid to the chamber, a container removably fitting within and substantially filling the chamber, the wall of said container being vertically corrugated, there being perforations in certain of said corrugations, said perforations terminating short of the bottom of the container, a closure for the container, a safety blow off in said closure, a closure for the chamber, and means securing the last recited closure in position.

In testimony whereof I have signed my name to this specification on this 10th day of November, A. D. 1920.

ALFRED M. DEMUTH.